US010826371B2

(12) United States Patent
Featherly et al.

(10) Patent No.: US 10,826,371 B2
(45) Date of Patent: Nov. 3, 2020

(54) ELECTRICAL POWER GENERATION AND DISTRIBUTION

(71) Applicant: ENERGY PRODUCING SYSTEMS OF AMERICA LLC, Boca Raton, FL (US)

(72) Inventors: Robert J. Featherly, New Port Richey, FL (US); Rudolph M. Tonchich, Holiday, FL (US); Jay Cholost, Boca Raton, FL (US)

(73) Assignee: Energy Producing Systems of America LLC, Boca Raton, FL (US)

( * ) Notice: Subject to any disclaimer, the term of this patent is extended or adjusted under 35 U.S.C. 154(b) by 0 days.

(21) Appl. No.: 16/800,146

(22) Filed: Feb. 25, 2020

(65) Prior Publication Data

US 2020/0204056 A1 Jun. 25, 2020

Related U.S. Application Data

(63) Continuation-in-part of application No. 16/430,342, filed on Jun. 3, 2019, which is a continuation of
(Continued)

(51) Int. Cl.
| | |
|---|---|
| *H02K 47/04* | (2006.01) |
| *B60L 53/63* | (2019.01) |
| *H02J 3/28* | (2006.01) |
| *B60L 50/15* | (2019.01) |
| *B60L 55/00* | (2019.01) |

(Continued)

(52) U.S. Cl.
CPC ............. *H02K 47/04* (2013.01); *B60L 50/15* (2019.02); *B60L 53/63* (2019.02); *B60L 55/00* (2019.02); *B60L 58/18* (2019.02); *H02J 3/28* (2013.01); *H02J 3/32* (2013.01); *H02J 7/0068* (2013.01)

(58) Field of Classification Search
CPC .... H02K 47/04; H02J 3/28; H02J 3/32; H02J 7/0068; B60L 50/15; B60L 53/63; B60L 55/00; B60L 58/18
See application file for complete search history.

(56) References Cited

U.S. PATENT DOCUMENTS

| | | |
|---|---|---|
| 6,856,040 B2 | 2/2005 | Feddersen |
| 8,509,973 B2 | 8/2013 | Goodwin |
| | (Continued) | |

OTHER PUBLICATIONS

International Searching Authority, International Search Report and Written Opinion for application PCT/US2020/019808, dated May 22, 2020.
(Continued)

*Primary Examiner* — Emily P Pham
(74) *Attorney, Agent, or Firm* — Quarles & Brady LLP

(57) ABSTRACT

Systems and methods of generating, storing and/or distributing electric power are disclosed. The system may include two or more direct current battery subsystems, a direct current motor/alternating current generator combination, an electric power distribution network, and battery recharging elements. One battery subsystem may power an alternating current generator while the other battery subsystem charges using a portion of the generated power. Excess power may service other electric loads. The roles of the battery subsystems may be switched periodically between charging and powering, repeatedly.

17 Claims, 9 Drawing Sheets

Related U.S. Application Data application No. 16/046,237, filed on Jul. 26, 2018, now Pat. No. 10,312,789, which is a continuation of application No. 15/400,662, filed on Jan. 6, 2017, now Pat. No. 10,050,509.

(51) Int. Cl.
  *H02J 3/32* (2006.01)
  *B60L 58/18* (2019.01)
  *H02J 7/00* (2006.01)

(56) References Cited

U.S. PATENT DOCUMENTS

| | | |
|---|---|---|
| 8,786,139 B2 | 7/2014 | Cummings |
| 9,263,968 B2 | 2/2016 | Potts |
| 10,050,509 B2 | 8/2018 | Featherly |
| 10,312,789 B2 | 6/2019 | Featherly |
| 2002/0070716 A1 * | 6/2002 | Gupta .................. H02P 9/48 322/59 |
| 2003/0015873 A1 | 1/2003 | Khalizadeh |
| 2006/0017328 A1 | 1/2006 | Bryde |
| 2009/0177595 A1 | 7/2009 | Dunlap |
| 2010/0213762 A1 | 8/2010 | Itoh |
| 2011/0084665 A1 | 4/2011 | White |
| 2012/0232728 A1 | 9/2012 | Karimi |
| 2012/0303189 A1 * | 11/2012 | Namuduri ............ B60W 10/06 701/22 |
| 2013/0154363 A1 | 6/2013 | Lim |
| 2013/0300380 A1 | 11/2013 | Brunotte |
| 2014/0300182 A1 | 10/2014 | James |
| 2016/0336928 A1 | 11/2016 | Kuznetsov |
| 2017/0168516 A1 | 6/2017 | King |
| 2018/0195495 A1 | 7/2018 | Williams |
| 2018/0331611 A1 | 11/2018 | Featherly |

OTHER PUBLICATIONS

International Searching Authority, International Search Report and Written Opinion for application PCT/US2018/012485, dated Feb. 13, 2018.

International Searching Authority, International Search Report and Written Opinion for application PCT/US2018/044021, dated Oct. 12, 2018.

* cited by examiner

ELECTRICAL POWER GENERATION AND DISTRIBUTION

CROSS REFERENCE TO RELATED APPLICATIONS

This application is a continuation-in-part of U.S. patent application Ser. No. 16/430,342 filed Jun. 3, 2019, which is a continuation of U.S. patent application Ser. No. 16/046,237 filed Jul. 26, 2018 and is now patented as U.S. patent Ser. No. 10/312,789, which relates to and claims the priority of U.S. patent application Ser. No. 15/400,662 which was filed Jan. 6, 2017 and is now patented as U.S. patent Ser. No. 10/050,509.

FIELD OF THE INVENTION

The present invention relates generally to systems and methods of generating, storing and/or providing electrical energy.

BACKGROUND OF THE INVENTION

The consumption of electrical power worldwide is vast and will likely continue to grow as traditionally non-electrical powered machines are replaced with electrically powered counterparts. For example, electrically powered vehicles, and in particular passenger automobiles, are becoming more and more prevalent on nations' road systems. One popular electric automobile manufacturer in the United States with annual sales of roughly fifty thousand units in 2015-16 has announced its intention to grow the number of sales to five hundred thousand units within just a few years.

The impetus for switching to electrical power is multi-faceted. The cost and environmental impact of generating electrical power is considered superior to that of alternative power sources, such as fossil fuel based power. This superiority is amplified by governmental and industry incentives to the consumer for utilizing electrical power in place of non-electrical power. For example, electric vehicle users have enjoyed tax breaks, preferred parking, preferred road access, and free recharging, all provided due to the use of electric power as opposed to fossil-fuel generated power for their transportation needs. Accordingly, there is a continued and growing need for systems to generate, store and distribute electrical power.

Developed countries all have sophisticated electrical power generation and distribution systems deployed nationwide sometimes referred to as the "power grid." While the grid is widely used and ubiquitous, it is not always available, and may not provide the lowest cost of power over a prolonged period. Although power outages are rare, occasional storms can disrupt the distribution of electric power to large segments of the population for prolonged periods. These power outages interfere with home life and work and can result in substantial lost productivity and comfort. Further, the cost of obtaining electric power from the grid can be significant, and there is little ability to inject much competition into the system to drive prices down. Accordingly, there is a need for both mobile and stationary electric power generation systems which are of a scale to power a single home, business, and vehicle, and which do not depend heavily on the grid for day-to-day operation.

Accordingly, it is an object of some, but not necessarily all embodiments of the present invention to provide systems and methods that generate electric power efficiently for home, business and vehicle use. It is also an object of some, but not necessarily all embodiments of the present invention to provide systems and methods that store and distribute electric power efficiently for home, business and vehicle use. These and other advantages of some, but not necessarily all embodiments of the present invention will be apparent to those of ordinary skill in the power generation, storage and distribution arts.

SUMMARY OF THE INVENTION

Responsive to the foregoing challenges, Applicant has developed an innovative electric power system comprising: an electric battery subsystem; a switching subsystem coupled to the electric battery subsystem; an electrically powered function control subsystem coupled to the switching subsystem and the electric battery subsystem, the electrically powered function control subsystem including a processor and memory; a capacitor subsystem coupled to the electrically powered function control subsystem; an electric motor coupled to the electrically powered function control subsystem; an electric generator subsystem operatively connected to the electric motor; an electric power distribution subsystem coupled to the electric generator subsystem by an inverter subsystem, said electric power distribution subsystem including an outlet load line configured to be connected to an electric load; an inductor subsystem coupled to the electric power distribution subsystem; and a rectifier subsystem coupled to the inductor subsystem, the switching subsystem, and the electric battery subsystem.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; an electrically powered function control subsystem coupled to the switching subsystem and the second poles of the first and second electric battery subsystems, said electrically powered function control subsystem including a processor and memory; a capacitor subsystem coupled to the electrically powered function control subsystem; an electric motor coupled to the electrically powered function control subsystem; an electric generator subsystem operatively connected to the electric motor; an electric power distribution subsystem coupled to the electric generator subsystem, said electric power distribution subsystem including an outlet load line configured to be connected to an electric load; an inductor subsystem coupled to the electric power distribution subsystem; and a rectifier subsystem coupled to the inductor subsystem, the switching subsystem, and the second poles of the first and second electric battery subsystems.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; an electrically powered function control subsystem coupled to the switching subsystem and the second poles of the first and second electric battery subsystems, said function control subsystem including a processor and memory; a capacitor subsystem coupled to the function control subsystem; an electric motor coupled to the function control subsystem; an electric generator operatively connected to the electric motor; an electric power distribution subsystem coupled to the electric generator subsystem, said electric power distribution subsystem including an outlet load line adapted to be connected to an electric load; an inductor subsystem coupled to the electric power distribution system; and a rectifier subsystem coupled to the inductor subsystem, the switching subsystem, and the second poles of the first and second electric battery subsystems.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; a battery charge controller subsystem coupled to the switching subsystem and the second poles of the first and second electric battery subsystems; an inverter coupled to the switching subsystem and the electric battery subsystem; an electric power distribution subsystem coupled to the inverter, the electric power distribution subsystem including an outlet load line configured to be connected to an electric load; a rectifier subsystem coupled to the electric power distribution subsystem; an electrically powered function control subsystem coupled to the rectifier subsystem, the electrically powered function control subsystem including a processor and memory; a capacitor subsystem coupled to the electrically powered function control subsystem; an electric motor coupled to the electrically powered function control subsystem; an electric generator subsystem including an electric generator, the electric generator operatively connected to, and receiving input rotational motion from, the electric motor, wherein output rotational speed of the electric motor and input rotational speed provided to the electric generator are invariable with respect to one another; and the battery charge controller subsystem coupled to the electric generator subsystem, the switching subsystem, the inverter, and the electric battery subsystem.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; an electrically powered function control subsystem coupled to the switching subsystem and the second poles of the first and second electric battery subsystems, said function control subsystem including a processor and memory; an inverter coupled to the switching subsystem and the electric battery subsystem; a first electric power distribution subsystem coupled to the inverter, the first electric power distribution subsystem including an outlet load line configured to be connected to an electric load; a rectifier subsystem coupled to the first electric power distribution subsystem; an electrically powered function control subsystem coupled to the switching subsystem, the inverter subsystem, and the electric battery subsystem, the electrically powered function control subsystem including a processor and memory; a capacitor subsystem coupled to the electrically powered function control subsystem; an electric motor coupled to the electrically powered function control subsystem; an electric generator subsystem including an electric generator, the electric generator operatively connected to, and receiving input rotational motion from, the electric motor, wherein output rotational speed of the electric motor and input rotational speed provided to the electric generator are invariable with respect to one another; and a second electric power distribution subsystem coupled to the electric generator subsystem and the inverter subsystem.

Applicant has further developed an innovative electric power system comprising: first and second electric battery subsystems, each having a first pole with a first polarity and a second pole with a second polarity; a switching subsystem coupled to the first pole of the first electric battery subsystem and the first pole of the second electric battery subsystem; rectifier/inductor subsystem coupled to the first and the second poles of the first and second electric battery subsystems, a rectifier subsystem coupled to the electric battery subsystem; a breaker subsystem coupled to the rectifier subsystem; an electrically powered function control subsystem coupled to the rectifier subsystem, the electrically powered function control subsystem including a processor and memory; a capacitor subsystem coupled to the electrically powered function control subsystem; an electric motor coupled to the electrically powered function control subsystem; an electric generator subsystem including an electric generator, the electric generator operatively connected to, and receiving input rotational motion from, the electric motor, wherein output rotational speed of the electric motor and input rotational speed provided to the electric generator are invariable with respect to one another; an inverter subsystem coupled to the electric generator subsystem; an electric power distribution subsystem coupled to the inverter subsystem and the breaker system, the electric power distribution subsystem including an outlet load line configured to be connected to an electric load; a battery charge controller subsystem coupled to the electric generator subsystem and the electric battery subsystem.

Applicant has further developed an innovative method of generating, storing and distributing electric power comprising: applying direct current electric power from a first electric battery subsystem to a function control subsystem, wherein said function control subsystem is coupled to a capacitor subsystem; applying direct current electric power from the function control subsystem to a direct current motor; providing input rotational motion from the direct current motor to and generating output rotational motion from the direct current motor; generating alternate current electric power from the output rotational motion of the direct current motor; distributing a first portion of the generated alternate current electric power to an outlet load line adapted to be connected to an electric load, and a second portion of the generated alternate current electric power to an inductor subsystem; applying alternate current electric power from the inductor subsystem to a rectifier subsystem and generating direct current electric power using the rectifier subsystem; and applying direct current electric power from the rectifier subsystem to a second electric battery subsystem, wherein the relationship of the input rotational motion to the output rotational motion of the direct current motor is set to optimize power depletion of the first battery subsystem for a predetermined level of available power on the outlet load line and predetermined durations of the first, second and third operational phases.

Applicant has further developed an innovative method of generating, storing and distributing electric power comprising: applying direct current electric power from an electric battery subsystem to a switching subsystem, wherein the switching subsystem is coupled to an inverter subsystem; applying alternate current electric power from the inverter subsystem to an energy distribution subsystem; distributing a first portion of the alternate current electric power to an outlet load line configured to be connected to an electric load, and a second portion of the alternate current electric power to a rectifier subsystem; applying direct current from the rectifier subsystem to a function control subsystem;

applying direct current from the function control subsystem to a direct current motor; providing input rotational motion from the direct current motor to an electric generator, wherein output rotational speed of the direct current motor and input rotational speed provided to the electric generator are invariable with respect to one another; generating direct current electric power from the output rotational motion of the direct current motor, wherein a rotational speed is set to optimize wattage supply for external electric distribution; applying direct current electric power from the direct current electric generator subsystem to a battery charge controller subsystem; and applying the direct current electric power from the battery charge controller subsystem to the switching subsystem, the inverter, and the electric battery subsystem.

Applicant has further developed an innovative method of generating, storing and distributing electric power comprising: applying direct current electric power from an electric battery subsystem to a switching subsystem, wherein the switching subsystem is coupled to an inverter subsystem; converting the direct current electric power to alternate current electric power; distributing a first portion of the alternate current electric power to a first energy distribution system coupled to an outlet load line configured to be connected to an electric load, and a second portion of the alternate current electric power to a second energy distribution subsystem; applying alternate current electric power from the first energy distribution subsystem to a rectifier subsystem; applying direct current electric power from the rectifier subsystem to function control subsystem; applying the direct current electric power from the function control subsystem to a direct current motor; providing input rotational motion from the direct current motor to an electric generator, wherein output rotational speed of the direct current motor and input rotational speed provided to the electric generator are invariable with respect to one another; generating alternate current electric power from the output rotational motion of the direct current motor, wherein a rotational speed is set to optimize wattage supply for external electric distribution; applying alternate current electric power to the second energy distribution subsystem; converting the alternate current electric power to direct current electric power; and applying direct current electric power to the electric battery subsystem.

Applicant has further developed an innovative method of generating, storing and distributing electric power comprising: applying direct current electric power from an electric battery subsystem to a rectifier subsystem; applying direct current power from the rectifier subsystem to a function control subsystem, wherein the function control subsystem is coupled to a capacitor subsystem; applying the direct current electric power from the function control subsystem to a direct current motor; providing input rotational motion from the direct current motor to an electric generator, wherein output rotational speed of the direct current motor and input rotational speed provided to the electric generator are invariable with respect to one another; generating direct current electric power from the output rotational motion of the direct current motor; converting the direct current electric power to an alternate current electric power; applying the direct current electric power to a power distribution system; distributing a first portion of the alternate current electric power from the power distribution system to a load source, and a second portion of the alternate current electric power from the power distribution system to a breaker subsystem; applying alternate current electric power from the breaker subsystem to a rectifier subsystem; applying direct current electric power from the rectifier subsystem to the electric battery subsystem; and applying electric current from the electric generator through a battery charge controller subsystem to the electric battery subsystem.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

DETAILED DESCRIPTION OF EMBODIMENTS OF THE INVENTION

Reference will now be made in detail to embodiments of the present invention, examples of which are illustrated in the accompanying drawings.

Figure 1:
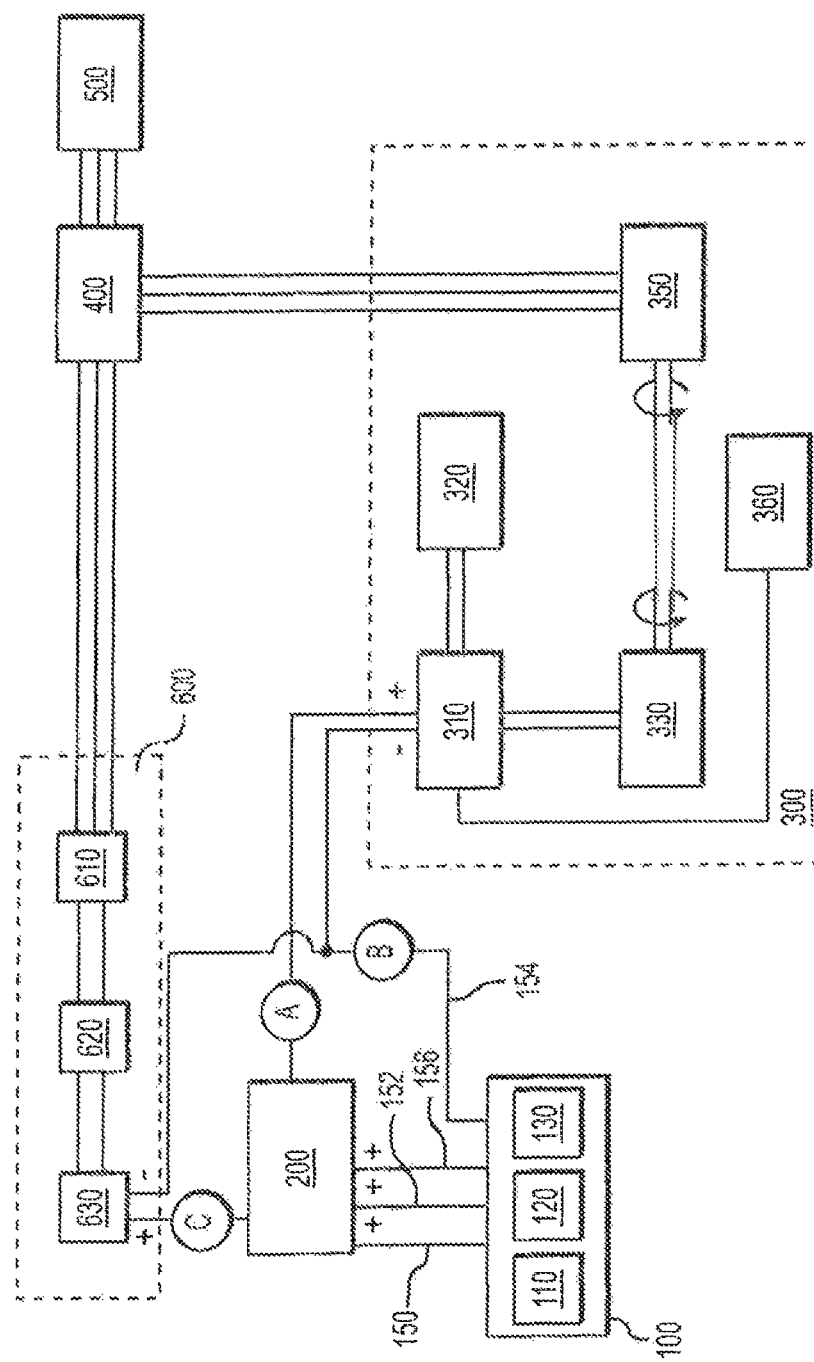
FIG. 1 is a schematic diagram of an electric power generation, distribution and storage system in accordance with a first embodiment of the present invention.

With reference to FIG. 1, in a first embodiment of the invention, a direct current (DC) battery system 100 may be electrically connected by a switching subsystem 200 to an electric power generation system 300. The power generation system 300 may be electrically connected to an AC power distribution subsystem 400, which in turn may be connected to a load source 500 and a battery charging system 600. The battery charging system 600 may be connected to the battery system 100 through the switching subsystem 200.

The DC battery system 100 may include first, second and third battery subsystems or banks 110, 120 and 130 that may each be comprised of a plurality of individual batteries and battery cells. The individual batteries and battery cells comprising each of the battery subsystems may be connected in series. In one non-limiting example, each battery subsystem may include a total of twelve lead-acid 12 volt, 200 amp, deep cycle batteries. Battery subsystems having these parameters may provide 5 kW constant output for a 15 minute period followed by 15 minutes of recharging (or rest) and 15 minutes of rest if just recharged (or recharging if just rested). In one non-limiting example, each battery subsystem may include at least one lithium ion battery. It is appreciated that the type, voltage, amperage and other materials and qualities of the batteries used may vary without departing from the intended scope of the invention.

The batteries should have sufficient power and amperage when combined into battery subsystems to power the switching subsystem 200, power generation system 300, load source 500 and battery charging system 600 for a defined period of time without excessive discharge. In one embodiment, each battery subsystem 110, 120 and 130 may, at the start of battery life, power the overall system for fifteen (15) minute periods out of a forty-five (45) minute cycle without discharging more than about twenty percent (20%).

First positive poles of the first, second and third battery subsystems 110, 120 and 130 may be electrically connected to the switching subsystem 200 via conductors 150, 152 and 156, respectively. In turn, the switching subsystem 200 may be electrically connected via a positive polarity conductor through point A to the power generation system 300 and via a positive polarity conductor through point C to the battery charging system 600. The negative poles of the first, second and third battery subsystems 110, 120 and 130 may be electrically connected to the power generation system 300 and the battery charging system 600 via conductor 154 through point B.

Figure 2:
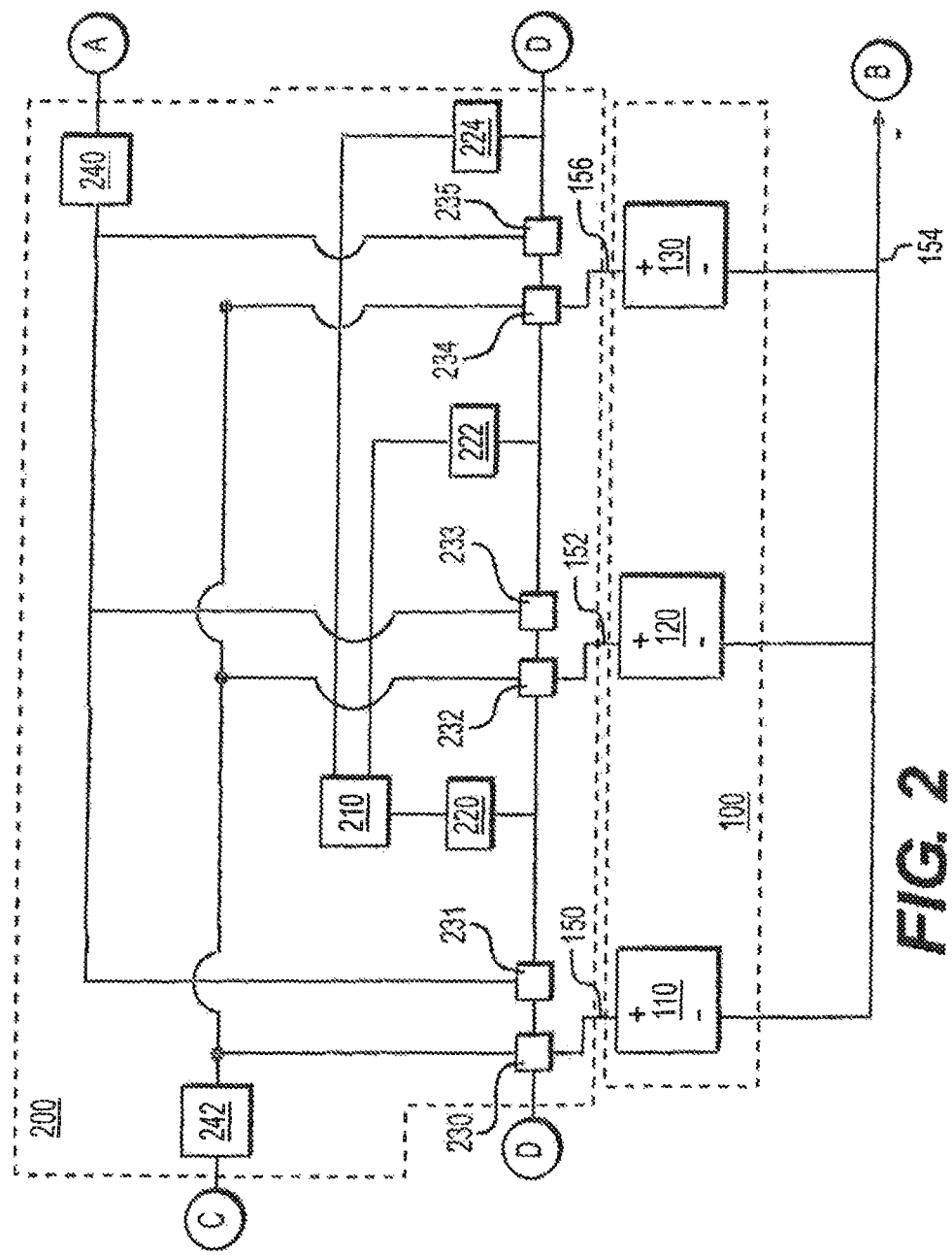
FIG. 2 is a detailed schematic diagram of the battery subsystem and switching subsystem of the system illustrated in FIG. 1.

One non-limiting embodiment of the switching subsystem 200 is illustrated in FIG. 2. With reference to FIG. 2, the switching subsystem 200 may include one or more timers 210 that may be electrically connected to first, second and third low voltage contactors 220, 222 and 224. The first low voltage contactor 220 may control first and second high voltage contactors 231 and 232; the second low voltage contactor 222 may control third and fourth high voltage contactors 233 and 234; and the third low voltage contactor 224 may control fifth and sixth high voltage contactors 235 and 230, connected together through point D in the circuit.

Under control of the timers 210 and the first and third low voltage contactors 220 and 224, the first and sixth high voltage contactors 231 and 230 may selectively connect the first battery subsystem 110 to a first bus 240, a second bus 242, or to neither bus. The timers 210 and the first and second low voltage contactors 220 and 222 may control the second and third high voltage contactors 232 and 233 to selectively connect the second battery subsystem 120 to the first bus 240, the second bus 242, or to neither bus. Similarly, the timers 210 and the second and third low voltage contactors 222 and 224 may control the fourth and fifth high voltage contactors 234 and 235 to selectively connect the third battery subsystem 130 to the first bus 240, the second bus 242, or to neither bus.

The timers 210 may send low voltage control signals to the first, second and third low voltage contactors 220, 222 and 224 automatically and/or under the control of a function control subsystem, discussed below. Such signals may activate a particular low voltage contactor and cause it to open or close the high voltage contactors connected to it. As a result, the combination of the timers 210, low voltage contactors 220, 222 and 224, and high voltage contactors 230, 231, 232, 233, 234 and 235 may selectively connect each of the battery subsystems 110, 120 and 130 to the first bus 240, the second bus 242 or to neither bus. The cascade arrangement of the timers 210, the low voltage contactors 220, 222, 224, and the high voltage contactors 230-235 permits only one of the battery subsystems to be connected to the first bus 240 and only one other of the battery subsystems to be connected to the second bus 242, at a time. It is appreciated, however that the system may tolerate the possibility of a short duration of overlap time during which two battery subsystems may be connected to the same bus at the same time.

With reference to FIGS. 1 and 2, the first bus 240 may be connected through point A to the power generation system 300, and the second bus 242 may be connected through point C to the battery charging system 600. Thus, functionally the switching subsystem 200 may be adapted to selectively switch between:

(i) connecting the first pole of the first battery subsystem 110 to the battery charging system 600 while at the same time connecting the first pole of the second battery subsystem 120 to the power generation system 300 during a first operational phase, (ii) connecting the first pole of the second battery subsystem 120 to the battery charging system 600 while at the same time connecting the first pole of the third battery subsystem 130 to the power generation system 300 during a second operational phase, and (iii) connecting the first pole of the third battery subsystem 130 to the battery charging system 600 while at the same time connecting the first pole of the first battery subsystem 110 to the power generation system 300 during a third operational phase.

Figure 3:
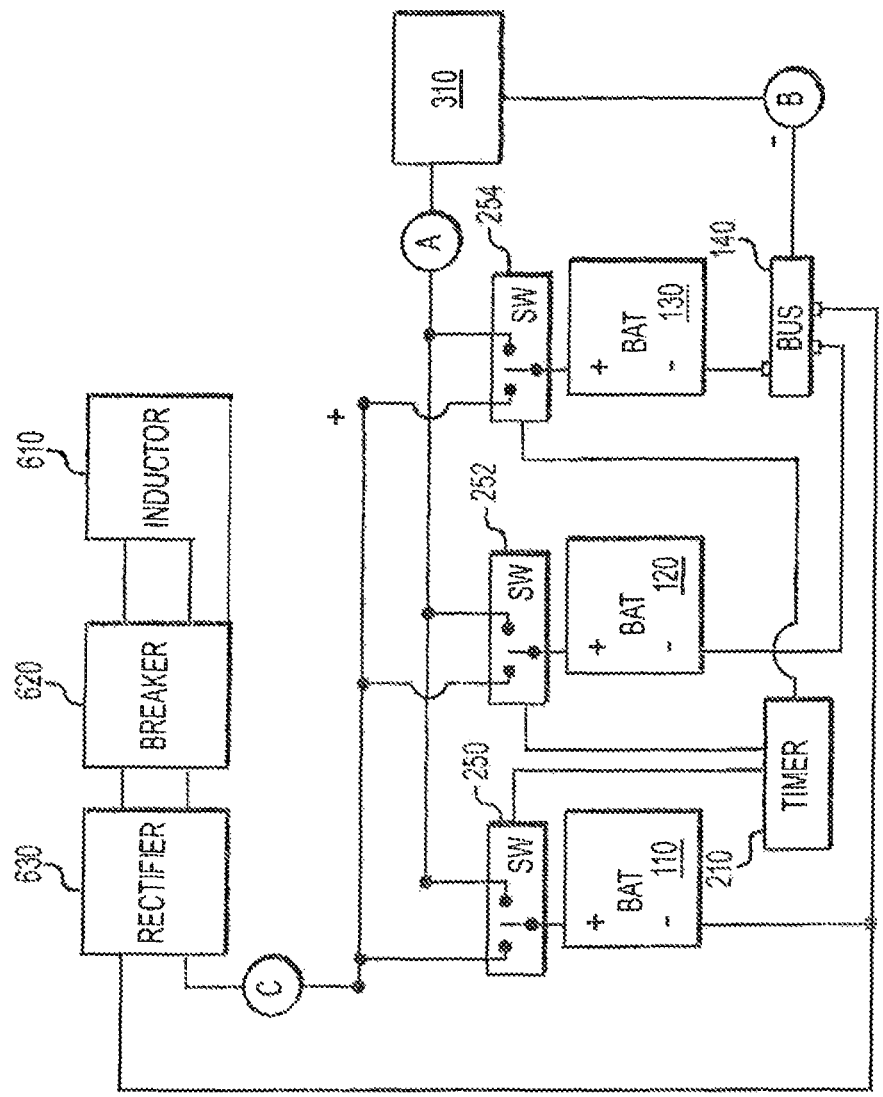
FIG. 3 is a detailed schematic diagram of an alternative switching subsystem for the system illustrated in FIG. 1.

An alternative embodiment of the switching subsystem 200 is illustrated by the FIG. 3 schematic diagram. With regard to FIGS. 1 and 3, three-way switches 250, 252 and 254 may each connect the positive pole of an associated battery subsystem (110, 120 and 130) to one of: point A or point C in the overall circuit, or a circuit disconnect position (as shown). The three-way switches 250, 252, and 254 may be controlled by one or more timers 210 to provide switching similar to that provided by the FIG. 2 embodiment.

With renewed reference to FIG. 1, the power generation system 300 may include a function control subsystem 310 electrically connected to and powered by the battery system 100 through the switching subsystem 200. The function control subsystem 310 may optionally be connected to and control the timers 210 in the switching subsystem 200. The function control subsystem 310 may provide power from one of the battery subsystems in the battery system 100 at a time to drive a DC electric motor 330, which in turn may drive an AC electric generator 350. The function control subsystem 310 may control the speed of the electric motor subsystem 330.

Regular generators possess a high torque requirement, which made the addition of a gear box necessary in previously known systems. In those systems a gear box was required to lower the torque and lower the power consumed by the motor. By using a novel specially designed generator with low torque requirements the gear box is eliminated from the current system. This removes a mechanical element from the system that may be subject to failure and it further removes the stress the gear box added to the system, and makes the system more efficient.

The power generation system 300 may also include a cooling subsystem 360 controlled by the function control subsystem 310. The cooling subsystem 360 may be in operational contact with any and/or all heat generating components of the overall system, such as the function control subsystem 310, the electric motor 330, and the electric generator 350. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, electric generator torque, electric generator rpm, battery charging system load, rectifier settings and inductor settings.

The size and operational characteristics of the electric motor 330 and electric generator 350 may be selected to provide optimal power generation and battery life for a given expected load 500 to be serviced by the system, as well as recharge rate and time for the battery subsystems 110, 120 and 130. For battery subsystems of the type described, the electric motor 330 may require 144V/100 A to maintain operation. The speed of the electric motor 330 is preferably set at or near the minimum rpm needed to drive the electric generator to provide the required amperage and voltage to service the load 500 and recharge one battery subsystem while at the same time reducing or minimizing torque imposed by the electric generator 350. The use of a novel low torque requirement electric generator 350 may provide torque at the electric generator 350 without increasing (and preferably decreasing) the torque requirements of the electric motor 330, thereby lowering the power drain on the battery subsystem driving the electric motor and improving battery depletion characteristics for a given power output of the generator.

The speed of the electric motor 330 may be automatically set on a real-time, moment-to-moment basis by the function control subsystem 310. The function control subsystem 310 may receive electric motor 330 speed data from a speed sensor, located for example on the shaft of the motor, as well as battery recharging and load 500 power requirements from other sensors. The function control subsystem 310 may adjust the electric motor 330 speed so that the electric generator 350 provides the required power at that point in time at maximum torque to the generator and minimum torque on the motor. In this manner, the function control subsystem 310 may optimize power generation conditions (electric motor rpm speed and electric generator rpm speed) on a real-time basis.

The electric generator 350 may be connected via one or more electrical conductors to the AC power distribution subsystem 400. The power distribution subsystem may comprise an AC breaker box, for example. The power distribution subsystem 400 may be connected via one or more conductors to the load source 500 and the battery charging system 600. The power needs of the load source 500 and the battery charging system 600 may be communicated to the function control subsystem 310 via wired or wireless communication channels from sensors associated with the power distribution subsystem 400, load source 500, and/or battery charging system 600. The power needs may be used by an automatic throttle control module of the function control subsystem 310 to set the electric motor 330 to run at the correct rpm's for the power needs of the system.

The battery charging system 600 may include an inductor subsystem 610, electrically connected via one or more circuit breakers 620 to a rectifier subsystem 630. The combination of the inductor subsystem 610 and the rectifier subsystem 630 are used to provide the required level of recharge to one of the idle battery subsystems 110, 120 or 130 over the desired recharge cycle, which, in the case of a system using three battery subsystems is one-third of the overall system cycle time. The rectifier subsystem 630 may be self-adjusting to accommodate the recharge draw of the battery subsystem currently charging. In other words, normally in the absence of the inductor subsystem 610, the self-adjusting rectifier subsystem 630 may reduce the voltage and/or amperage supplied to the battery subsystem undergoing recharge over the course of the charging cycle. As a result, without inclusion of the inductor subsystem 610, the battery subsystems may not recharge quickly enough to fully recharge in the desired cycle time. The addition of the inductor subsystem 610 with an adjustable rheostat may permit increasing the amperage draw of the battery charging system 600 (and thus the amperage available to recharge the idle battery subsystem) as compared with a system without an induction coil. Preferably, the rheostat setting of the inductor subsystem 610 may be automatically adjusted over the course of the recharging cycle under the control of the function control 310. The rheostat setting preferably should be adjusted in real time so that full or nearly full recharging is completed over the desired amount of time using the least amount of total power drain on the battery subsystem used to power the system during that time. In an embodiment, a battery charge controller subsystem 650 (not shown) may couple the electric generator subsystem 350 and the electric battery system 100.

The systems illustrated in FIGS. 1-3 may be used to generate, store and distribute electricity to power a load source 500 while at the same time generating electrical power to recharge depleted battery subsystems 110, 120 and/or 130 in the following manner. The method of using the illustrated systems may be initiated by the function control subsystem 310 transmitting a wired or wireless control signal to the switching subsystem 200 during a first operational stage. The function control subsystem 310 signals may cause the timer 210 to send low voltage control signals to the first, second and third low voltage contactors 220, 222 and 224. The timer 210 control signals may direct the first and third low voltage contactors 220 and 224 to couple the first positive pole of the first battery subsystem 110 to the first bus 240 through the conductor 150 and high voltage contactors 230 and/or 231. In turn, the first bus 240 connects the first battery subsystem 110 to the function control 310 and the electric motor 330. Because the second negative pole of the first battery subsystem 110 is permanently coupled to the function control 310 and the electric motor 330, a circuit is temporarily completed to power the electric motor using the first battery subsystem.

At the same time that the first battery subsystem is used to power the electric motor 330 (i.e., the first operational phase), control signals sent from the function control 310 to the timer 210 may be used to control the first, second and third low voltage contactors 220, 222 and 224 to make other battery subsystem connections and disconnections. Specifically, the low voltage contactors 220, 222, and 224 may be used to control the high voltage contactors 232, 233, 234 and 235 to temporarily connect the first positive pole of the second battery subsystem 120 to the second bus 242 and to temporarily isolate the first positive pole of the third battery subsystem 130 from any circuit. As a result, the second battery subsystem 120 may be connected to the rectifier subsystem 630, and the third battery subsystem 130 may be isolated during the first operational phase.

During the first operational phase, the electric motor 330 spins under the power of the first battery subsystem 110. The rotational motion of the electric motor 330 is used to drive the electric generator 350 through the electric motor 330. The torque resistance of the electric generator 350 on the electric motor may vary depending upon the load applied to the generator from the load source 500 and the battery charging system 600. The speed of electric motor 330 may be selectively adjusted by the function control 310 to optimize the speed for the load applied to the electric generator 350.

The electric power output of the electric generator 350 is directed in part by the distribution subsystem 400 to the battery charging system 600. The inductor subsystem 610 and the rectifier subsystem 630 of the battery charging system 600 work together, preferably under the control of the function control 310, to recharge the second battery subsystem 120 during the first operational phase. The first operational phase may be automatically ended after a set elapsed time, after detecting a set level of discharge of the first battery subsystem 110, or after a set level of recharge of the second battery subsystem 120.

The end of the first operational phase is followed immediately by the institution of a second operational phase during which the function control 310 directs the switching system 200: to substitute the second battery subsystem 120 for the first battery subsystem 110, to substitute the third battery subsystem 130 for the second battery subsystem 120, and to substitute the first battery subsystem 110 for the third battery subsystem 130. In other words, during the second operational phase, the second battery subsystem 120 is used to power, the third battery subsystem 130 is recharged, and the first battery subsystem 110 is disconnected from the power and recharging circuits. During a third operational phase, the third battery subsystem 130 powers the system, the first battery subsystem 110 is recharged, and the second battery subsystem 120 is disconnected. The rotation through the first, second and third operational phases may be repeated to provide uninterrupted power to the load source 500.

Figure 4:
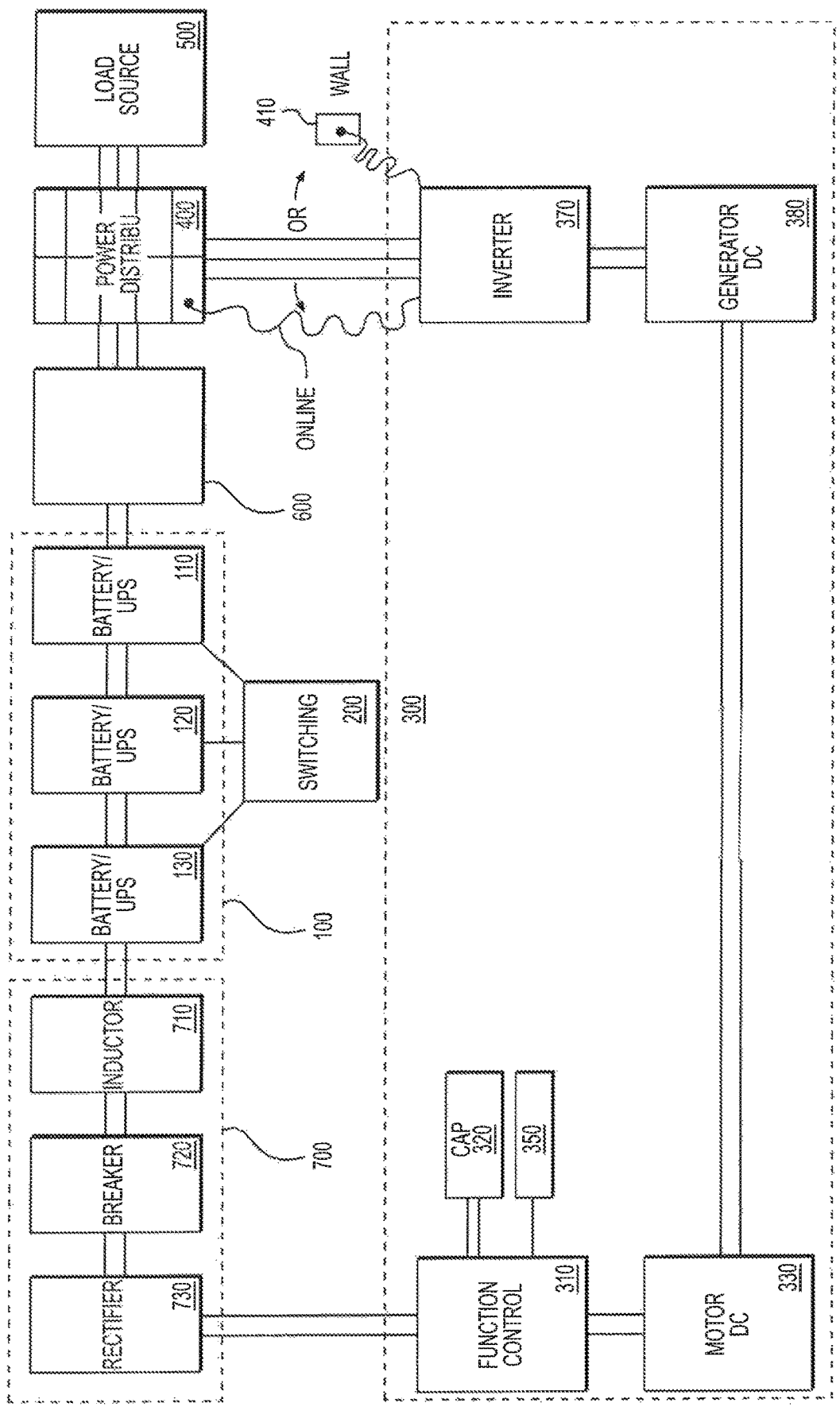
FIG. 4 is a schematic diagram of the components of the electric power generation, distribution and storage system in accordance with a second embodiment of the present invention used for on-grid power supply.

An alternative embodiment of the present invention is illustrated in FIG. 4, in which like reference characters refer to like elements which operate in like manner to those described in connection with the other embodiments. The power generation system 300 may be connected through an on-grid inverter 370 to an AC power distribution system 400 for powering a load source 500. The power generation system 300 also may be connected to a DC battery and Uninterruptible Power Supply (UPS) system 100 through a rectifier/inductor system 700. The battery/UPS system 100 may selectively supply power to the power generation system 300 through the rectifier/inductor system 700. A switching subsystem 200 may control the switching of the battery/UPS system 100 into and out of the overall circuit to receive recharging power from a battery charging system 600 which is connected to the power distribution system 400 to complete the circuit.

With continued reference to FIG. 4, the overall system may be initiated to generate power by connecting the battery/UPS system 100 to the rectifier/inductor system 700 under the control of the switching system 200. DC power may flow from the battery/UPS system 100 through inductor 710, circuit breaker 720 and rectifier 730. DC power from the rectifier 730 is provided to the power generation system 300. The function control subsystem 310 applies the DC power from the rectifier 730 to the DC electric motor subsystem 330. In turn, the DC motor drives a DC generator 380.

The electric motor 330 is operationally connected to the electric generator 350. The function control subsystem 310 may control the speed of the electric motor subsystem 330. The power generation system 300 may also include a cooling subsystem 360 controlled by the function control subsystem 310. The cooling subsystem 360 may be in operational contact with any and/or all heat generating components of the overall system, such as the function control subsystem 310, the electric motor subsystem 330, and the DC generator 380. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, electric generator torque, electric generator rpm, battery charging system load, rectifier settings and inductor settings.

In a preferred embodiment, the DC generator 380 may output 10 kw of power with relatively low torque requirements at low rpms. For example, the DC generator 380 may require 5 foot-pounds of torque per 1 kw of output power. The DC power output from the DC generator 380 may be provided to an on-grid (e.g., 10 kw) inverter 370 requiring 220 AC volts to operate. In turn, the AC power from the on-grid inverter 370 may be provided on-line to a local or national power grid, local power outlets, and the power distribution system 400. Once the overall system is up and generating power, the on-grid inverter 370 may supply all of the current demands for the load source 500 connected to the power distribution system 400, as well as supply the current needed to power the DC electric motor subsystem 330. Any excess power may be supplied from the on-grid inverter 370 to the national grid to power loads connected to the grid such as home wall outlets 410. This excess power delivered to the national grid may be sold to the power company or traded for credit.

As noted above, the power distribution system 400 may be connected to the battery charging system 600 including a rectifier. The power distribution system may be connected to the national grid to deliver power to homes, including wall outlets 410, and the like. The DC power from the battery charging system 600 may be used to keep the battery/UPS system 100 fully charged. Excess power not needed for recharging may be directed to the rectifier/inductor system 700 to be used to power the DC motor 330. When the battery/UPS system 100 is in a fully charged state, all of the power to drive the DC motor 330 may be supplied by the battery charging system 600. In this manner, the battery/UPS system 100 may function as a current catalyst as opposed to a current provider. In an embodiment, a battery charge controller subsystem 650 (not shown) may couple the power distribution subsystem 400 and the electric battery system 100.

Figure 5:
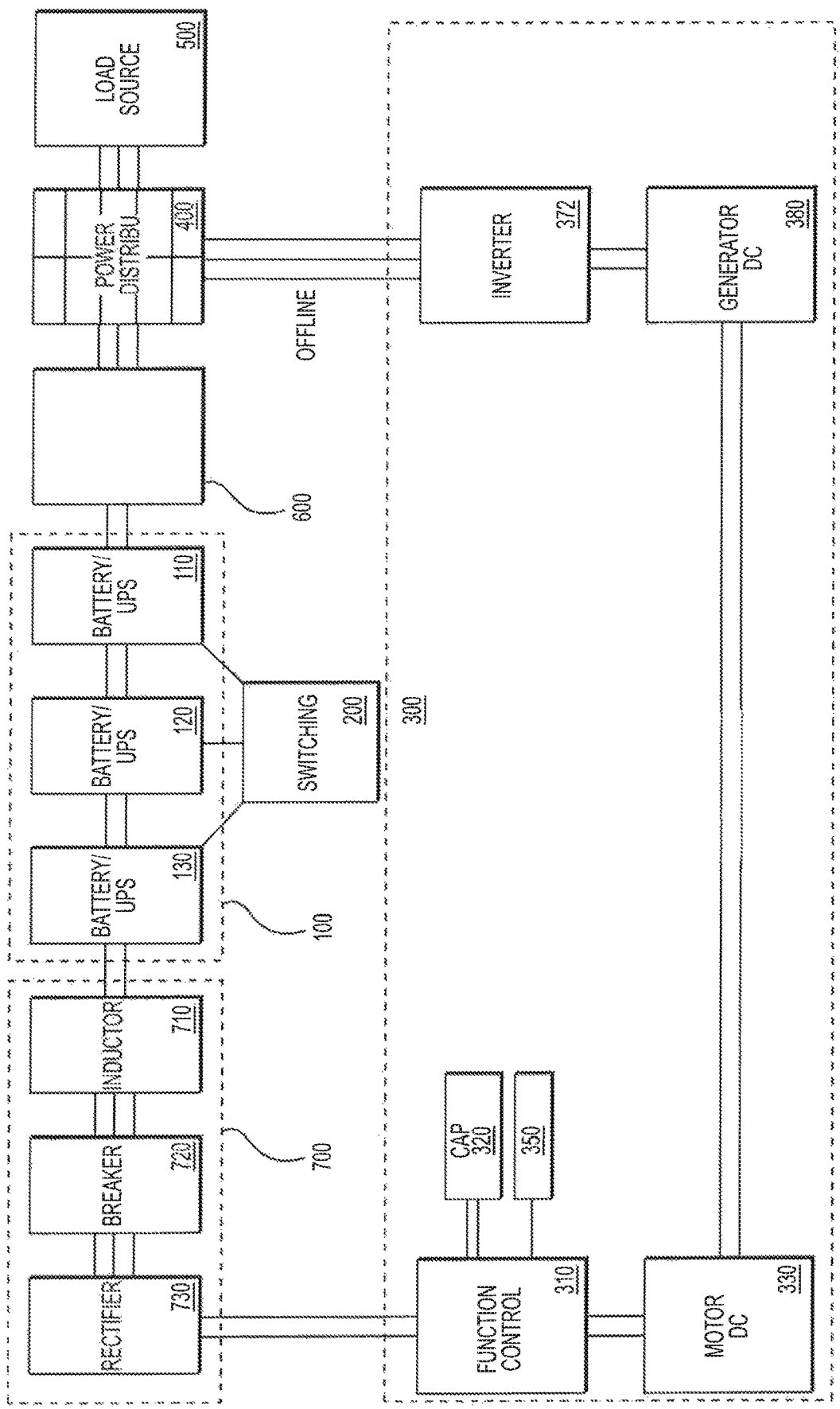
FIG. 5 is a schematic diagram of the components of the electric power generation, distribution and storage system in accordance with a third embodiment of the present invention used for off-grid power supply.

With reference to FIG. 5, a system that is almost identical to that shown in FIG. 4 is illustrated. The FIG. 5 system differs from the FIG. 4 system in that it includes an (e.g., 8 kw) off-grid inverter 372 instead of an on-grid inverter (370, FIG. 4). The off-grid inverter 372 is not connected to the national power grid. The system of FIG. 5 operates in the same way as the system of FIG. 4 except that there is no connection to the national power grid and thus no ability to supply power from the off-grid inverter 372 to the national power grid.

Figure 6:
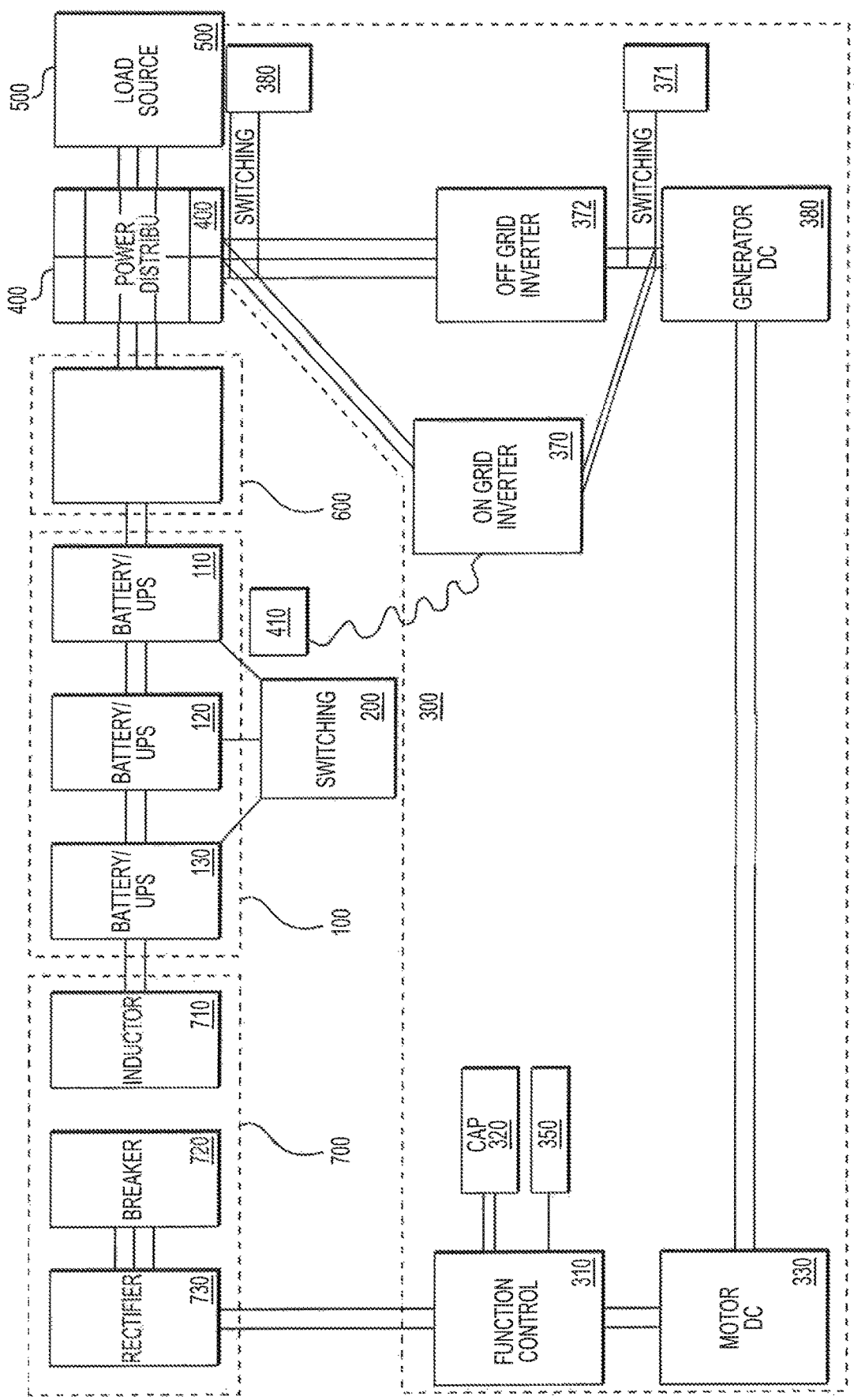
FIG. 6 is a schematic diagram of an electric power generation, distribution and storage system in accordance with a fourth embodiment of the present invention used for on-grid and off-grid power supply.

FIG. 6 illustrates a system which combines the elements of FIGS. 4 and 5 so that both an on-grid inverter 370 and an off-grid inverter 372 are included. The system of FIG. 6 may be used to provide uninterrupted power when the national grid goes down. The system of FIG. 6 includes a feature that causes the system to use the on-grid inverter 370 when the national power grid is functioning. When the national power grid fails, however, the system switches to using the off-grid inverter 372 to supply power, thereby disconnecting the system from the national power grid.

Figure 7:
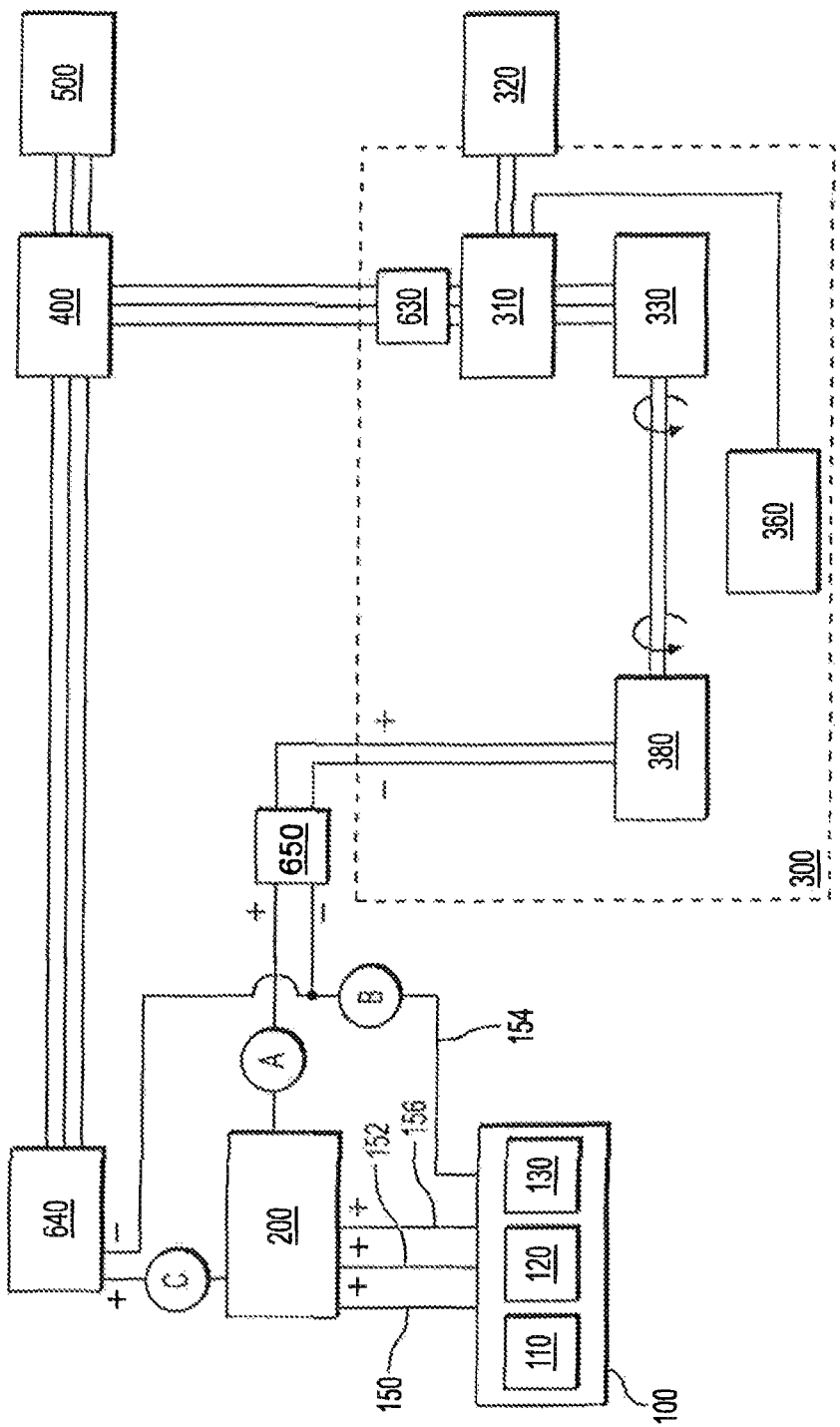
FIG. 7 is a schematic diagram of an electric power generation, distribution and storage system in accordance with a fifth embodiment of the present invention used for on-grid and off-grid power supply.

An alternative embodiment of the present invention is illustrated in FIG. 7, in which like reference characters refer to like elements which operate in like manner to those described in connection with the other embodiments.

A DC battery system 100 is connected to a switching subsystem 200 through conductors 150, 152, and 156. The switching system 200, in turn, is connected to an AC power distribution system 400 through a DC/AC inverter 640. The AC power distribution system 400 is connected to both a load source 500 and a power generation system 300. The power generation system 300, in turn, is connected to the switching system 200 through a battery charge controller subsystem 650.

Specifically, first positive poles of first, second and third battery subsystems 110, 120 and 130 of DC battery system 100 may be electrically connected to the switching subsystem 200 via conductors 150, 152 and 156, respectively. In turn, the switching subsystem 200 may be electrically connected via a positive polarity conductor through point A to the battery charge controller subsystem 650 and via a positive polarity conductor through point C to the DC/AC inverter 640. The negative poles of the first, second and third battery subsystems 110, 120 and 130 may be electrically connected to the battery charge controller subsystem 650 and the DC/AC inverter 640 via conductor 154 through point B.

Generally, a battery charge controller limits the rate at which electric current is added to or drawn from electric batteries. In this application, the battery charge controller subsystem 650 stops charging the batteries in the electric battery subsystem 100 when the batteries exceed a predetermined and set high voltage level, and re-enable charging when the battery voltage drops back below that predetermined level.

In an embodiment, battery charge controller subsystem 650 includes pulse width modulation (PWM) and maximum power point tracker (MPPT) technologies, adjusting charging rates depending on the battery's level, to allow charging closer to the battery's maximum capacity.

The battery charge controller subsystem 650 may reduce the possibility of overcharging and may protect against overvoltage, which can reduce battery performance or lifespan, and may pose a safety risk. The battery charge controller subsystem 650 may also prevent completely draining or deep discharging a battery, or perform controlled discharges, depending on the battery technology, to protect battery life. In an embodiment, the battery charge controller subsystem 650 applies the required load or draw on the electric generator subsystem 380 to ensure the electric battery subsystem 100 is recharged in a predetermined period of time. In an embodiment, the battery charge controller subsystem 650 applies the required load or draw on the electric generator subsystem 380 to ensure the electric battery subsystem 100 receives the required voltage and amperage at a predetermined rate.

The switching subsystem 200 may control the switching of the DC battery system 100 into and out of the overall circuit to receive recharging power through the battery charge controller subsystem 650 which is connected to the power generation system 300 to complete the circuit.

With continued reference to FIG. 7, the overall system may be initiated to generate power by connecting the DC battery system 100 to the DC/AC inverter 640 through and under the control of the switching system 200. DC power may flow from the DC battery system 100 through the switching subsystem 200 the DC/AC inverter 640 to the AC power distribution system 400.

AC power from the AC power distribution system 400 is provided to the power generation system 300 and the load source 500. The function control subsystem 310 applies the DC power from the rectifier 630, which is connected to the AC power distribution system 400, to the DC electric motor subsystem 330.

AC power from 400 is provided to 300 through 630. The DC power from 630 is provided to 330 through 310. In turn, the DC motor 330 drives a DC electric generator 380. As noted above, the power distribution system 400 may be connected to the power generation system 300 including a rectifier subsystem 630.

The function control subsystem 310, among other things, may control the speed of the DC electric motor subsystem 330. The rotational speed of the coupler between the DC motor 330 and the AC electric generator 350 may vary depending on need, but the rotational speed of the coupler is invariable with respect to the output speed of the DC electric motor 330 and the AC electric generator 350. In an embodiment, the DC electric motor 330 and the AC electric generator 350 are directly coupled.

The power generation system 300 may also include a cooling subsystem 360 controlled by the function control subsystem 310. The cooling subsystem 360 may be in operational contact with any and/or all heat generating components of the overall system, such as the function control subsystem 310, the DC electric motor subsystem 330, and the DC electric generator 380. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, electric generator torque, electric generator rpm, battery charging system load, rectifier settings, and inductor settings.

In a preferred embodiment, the DC generator 380 may output 10 kw of power with relatively low torque requirements at low rpms. For example, the DC generator 380 may require 5 foot-pounds of torque per 1 kw of output power.

Once the overall system is up and generating power, the DC/AC inverter 640 may supply all of the current demands for the load source 500 connected to the power distribution system 400, as well as supply the current needed to power the DC electric motor subsystem 330. In some embodiments the inverter 640 can shut down the DC electric motor 330 so that the system is powered by the battery subsystem 100. When the battery subsystem 100 discharges to a predetermined level, the inverter 640 will restart the DC electric motor 330.

The DC power flowing from the power generation system 300 through the battery charge controller subsystem 650 may be used to keep the DC battery system 100 fully charged.

Excess power not needed for recharging may be directed to the inverter subsystem 640, power distribution subsystem 400, rectifier subsystem 630 and electric function control 310 to be used to power the DC motor 330.

When the DC battery system 100 is in a fully charged state, all of the power to drive the DC motor 330 may be supplied by the battery charging system 600. In this manner, the DC battery system 100 may function as a current catalyst as opposed to a current provider.

Figure 8:
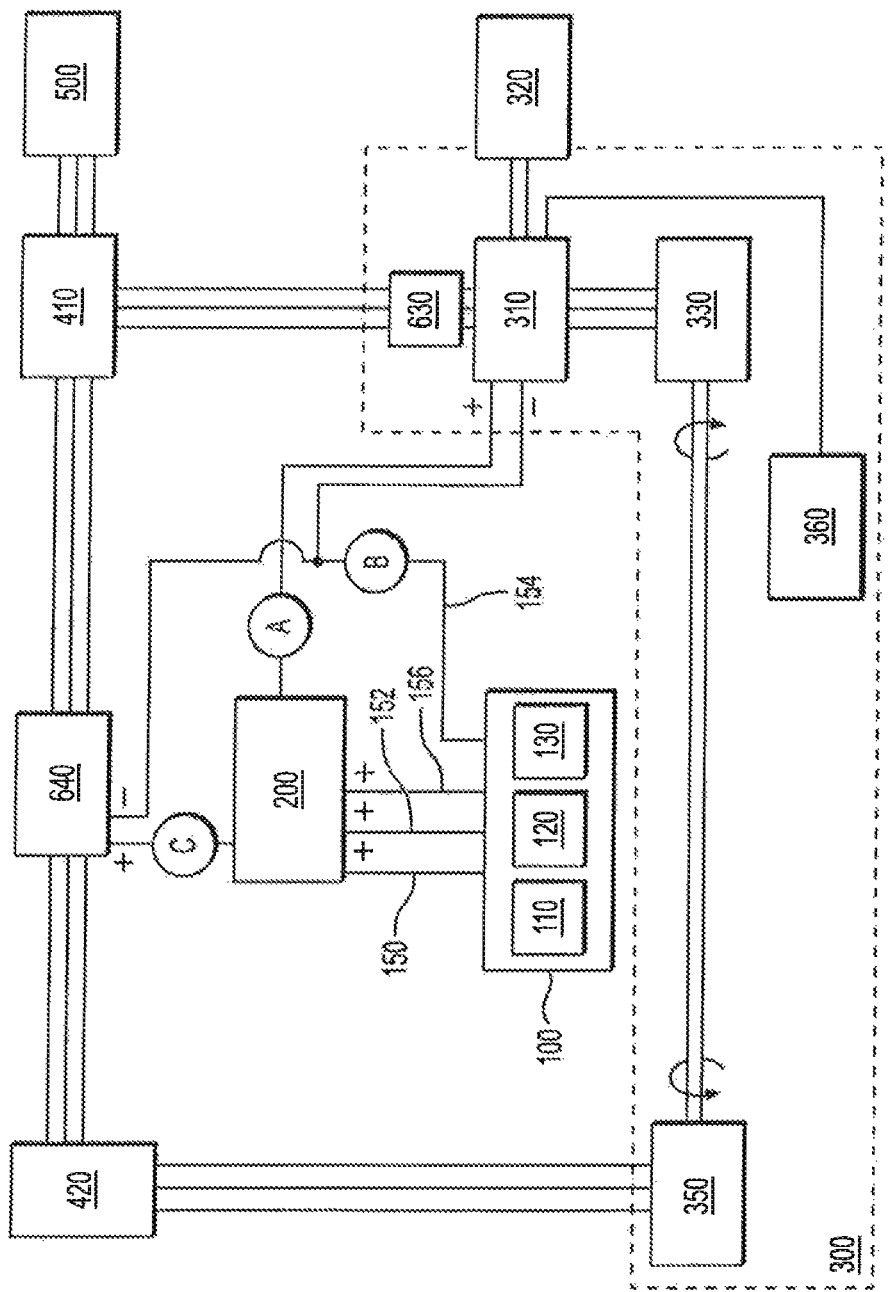
FIG. 8 is a schematic diagram of an electric power generation, distribution and storage system in accordance with a sixth embodiment of the present invention used for on-grid and off-grid power supply.

An alternative embodiment of the present invention is illustrated in FIG. 8, in which like reference characters refer to like elements which operate in like manner to those described in connection with the other embodiments.

A DC battery system 100 is connected to a switching subsystem 200 through conductors 150, 152, and 156. The switching system 200, in turn, is connected to a first AC power distribution system 410 and a second AC power distribution system 420 through a DC/AC inverter 640. The first AC power distribution system 410 is connected to both a load source 500 and a power generation system 300. The power generation system 300 is connected to the second AC power distribution system 420. The power generation system 300 comprises a rectifier subsystem receiving AC power from the first AC power distribution subsystem. The power generation system 300 also comprises a function control subsystem 310, a DC electric motor 330, and an AC generator 350, all of which are discussed in greater detail below.

Specifically, first positive poles of first, second and third battery subsystems 110, 120 and 130 of DC battery system 100 may be electrically connected to the switching subsystem 200 via conductors 150, 152 and 156, respectively. In turn, the switching subsystem 200 may be electrically connected via a positive polarity conductor through point A to the function control subsystem 310 and via a positive polarity conductor through point C to the DC/AC inverter 640. The negative poles of the first, second and third battery subsystems 110, 120 and 130 may be electrically connected to the function control subsystem 310 and the DC/AC inverter 640 via conductor 154 through point B.

The switching subsystem 200 may control the switching of the DC battery system 100 into and out of the overall circuit to receive recharging power through the funtion control subsystem 310 which is a part of the power generation system 300 to complete the circuit.

With continued reference to FIG. 8, the overall system may be initiated to generate power by connecting the DC battery system 100 to the DC/AC inverter 640 through and under the control of the switching system 200. In turn, AC electric power from inverter 640 may flow the first AC power distribution subsystem 410.

A first portion of the AC power from the first AC power distribution system 410 is provided to the load source 500 and a second portion of the AC power is provided to a rectifier 630, which is part of the power generation system 300.

The function control subsystem 310 applies the DC power from the rectifier 630 to the DC electric motor subsystem 330. In turn, the DC motor 330 drives an AC electric generator 350. AC electric power from AC generator 350 then flows to the second AC power distribution system 420, and, in turn, to the inverter 640 to complete the circuit.

The function control subsystem 310, among other things, may control the speed of the DC electric motor subsystem 330. The rotational speed of the coupler between the DC motor 330 and the AC electric generator 350 may vary depending on need, but the rotational speed of the coupler is invariable with respect to the output speed of the DC electric motor 330 and the AC electric generator 350. In an embodiment, the DC electric motor 330 and the AC electric generator 350 are directly coupled.

The power generation system 300 may also include a cooling subsystem 360 controlled by the function control subsystem 310. The cooling subsystem 360 may be in operational contact with any and/or all heat generating components of the overall system, such as the function control subsystem 310, the DC electric motor subsystem 330, and the AC electric generator 350. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, electric generator torque, electric generator rpm, battery charging system load, rectifier settings, and inductor settings.

In a preferred embodiment, the DC generator 380 may output 10 kw of power with relatively low torque requirements at low rpms. For example, the DC generator 380 may require 5 foot-pounds of torque per 1 kw of output power.

Once the overall system is up and generating power, the DC/AC inverter 640 may supply all of the current demands for the load source 500 connected to the power distribution system 400, as well as supply the current needed to power the power generation subsystem 300, and in particular, the DC electric motor subsystem 330. In some embodiments, the inverter 640 can shut down the DC electric motor 330 so that the system is powered by the battery subsystem 100. When the battery subsystem 100 discharges to a predetermined level, the inverter 640 will restart the DC electric motor 330.

The DC power flowing from the power generation system 300 through the battery charge controller subsystem 650 may be used to keep the DC battery system 100 fully charged.

In this embodiment, compared to that shown in FIG. 7, DC generator 380 is replaced by AC generator 350. This enables running the AC current directly to the second Power Distribution Panel 420. And applies the AC power directly to the DC/AC inverters, which in turn will have the same effect on the inverters as would be the case with a grid tie. The sensors within the inverter would detect the AC power and allow it to flow through them directly to the first power distribution panel 410. In addition, by using an AC generator there is no longer a requirement for the battery charge controller subsystem 650, as the system will utilize the charge controller contained in the inverter.

Figure 9:
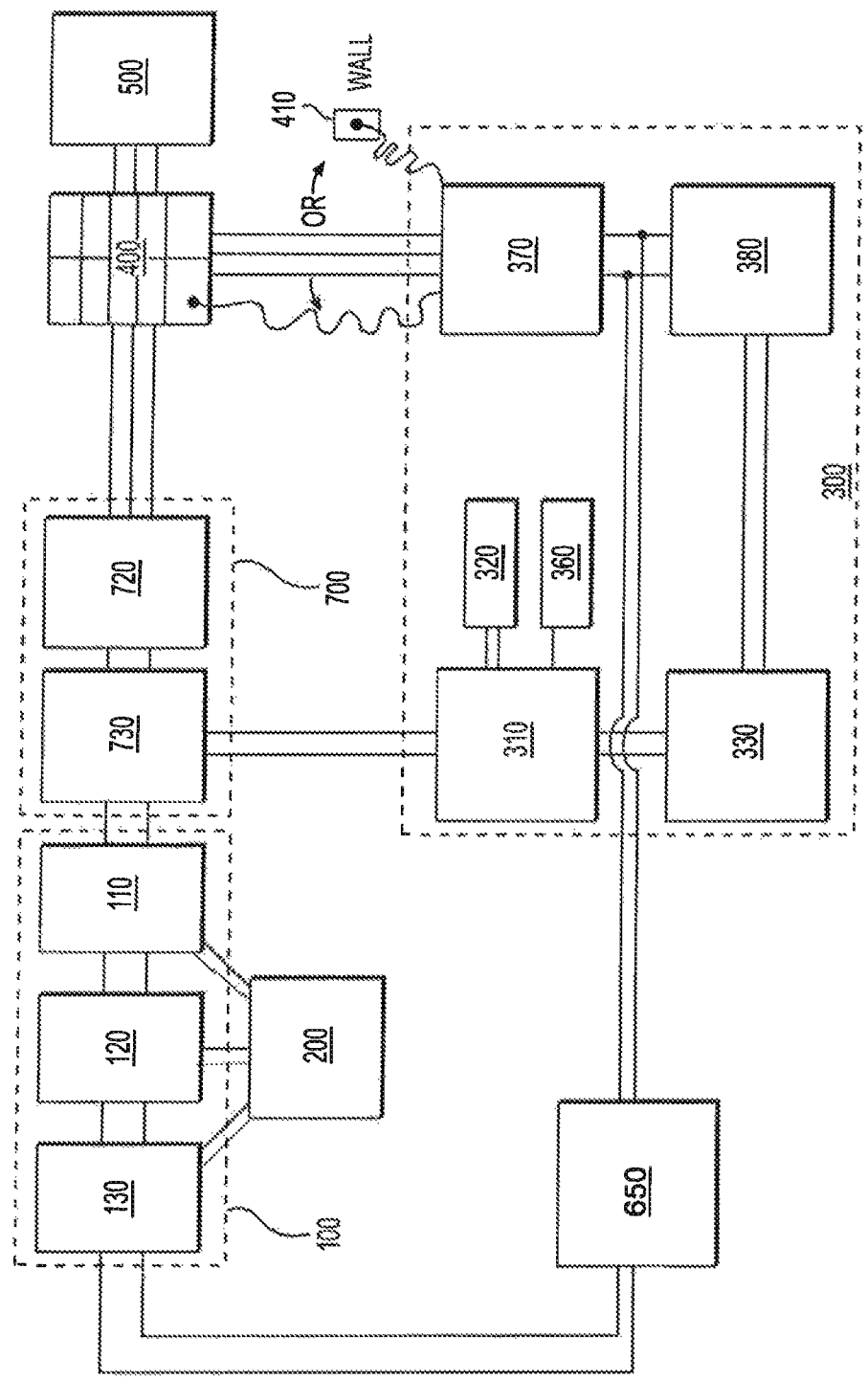
FIG. 9 is a schematic diagram of an electric power generation, distribution and storage system in accordance with a seventh embodiment of the present invention used for on-grid and off-grid power supply.

An alternative embodiment of the present invention is illustrated in FIG. 9, in which like reference characters refer to like elements which operate in like manner to those described in connection with the other embodiments.

A DC power generation system 300 may be connected through an on-grid inverter 370 to an AC power distribution system 400 for powering a load source 500. The DC power generation system 300 also may be connected to a DC battery system 100 through an rectifier/inductor system 700. The battery/UPS system 100 may selectively supply power to the power generation system 300 through the rectifier/inductor system 700. A switching subsystem 200 may control the switching of the battery 100 into and out of the overall circuit to receive recharging power from a battery charge controller subsystem 650 which is connected to the DC generator 380 to complete the circuit.

With continued reference to FIG. 9, the overall system may be initiated to generate power by connecting the battery 100 to the rectifier/inductor system 700 under the control of the switching system 200. DC power may flow from the battery/UPS system 100 through rectifier 730 and circuit breaker 720. DC power from the rectifier 730 is provided to the power generation system 300. The function control subsystem 310 applies the DC power from the rectifier 730 to the DC electric motor subsystem 330. In turn, the DC motor drives a DC electric generator 380. The rotational speed of the coupler between the DC motor 330 and the AC electric generator 350 may vary depending on need, but the rotational speed of the coupler is invariable with respect to the output speed of the DC electric motor 330 and the AC electric generator 350. In an embodiment, the DC electric motor 330 and the AC electric generator 350 are directly coupled.

The function control subsystem 310 may control the speed of the electric motor subsystem 330. The power generation system 300 may also include a cooling subsystem 360 controlled by the function control subsystem 310. The cooling subsystem 360 may be in operational contact with any and/or all heat generating components of the overall system, such as the function control subsystem 310, the electric motor subsystem 330, the gear box 340 and the DC electric generator 380. The cooling subsystem 360 may maintain system elements in optimal operating temperature ranges in a manner known to those of skill in the art.

A capacitor subsystem 320 may be electrically coupled to the function control subsystem 310. The capacitor subsystem 320 may include a plurality of capacitors interconnected in parallel with one another. The capacitor subsystem 320 may be used to control and correct system characteristics such as power factor lag and phase shift. The capacitor subsystem 320 may also increase stored energy and improve stabilization of the sine wave generated by the processor in the function control subsystem 310.

The function control subsystem 310 may include a digital processor, digital memory components, and control programming as needed to operate the overall system in the manner described herein. For example, the function control subsystem 310 may include programming that controls system components for a start-up sequence, a shut-down sequence, vibration monitoring, over heat monitoring, and remote monitoring. The function control subsystem 310 may also include or be connected to one or more parameter monitoring components that provide system data. Such data may include, but not limited to: battery charge level and capacity, battery amperage, battery voltage, battery usage time, battery charge time, current time, system element temperatures, vibration, source load, electric motor torque, electric motor rpm, electric generator torque, electric generator rpm, battery charging system load, and rectifier settings.

In a preferred embodiment, the DC generator 380 may output 10 kw of power with relatively low torque requirements at low rpms. For example, the DC generator 380 may require 5 foot-pounds of torque per 1 kw of output power.

The DC power output from the DC generator 380 may be provided to an on-grid (e.g., 10 kw) inverter 370 requiring 220 AC volts to operate. In turn, the AC power from the on-grid inverter 370 may be provided on-line to a local or national power grid, local power outlets, and the power distribution system 400. Once the overall system is up and generating power, the on-grid inverter 370 may supply all of the current demands for the load source 500 connected to the power distribution system 400, as well as supply the current needed to power the DC electric motor subsystem 330 through the power distribution system 400 and the rectifier/inductor system 700. Any excess power may be supplied from the on-grid inverter 370 to the national grid to power loads connected to the grid such as home wall outlets 410. This excess power delivered to the national grid may be sold to the power company or traded for credit.

As noted above, the power distribution system 400 may be connected to the battery charging system 600 through inductor system 70, which includes a circuit breaker 720 and a rectifier 730. The power distribution system may be connected to the national grid to deliver power to homes, including wall outlets 410, and the like. The DC power flowing from the DC generator 380 through the battery charge controller subsystem 650 may be used to keep the battery/UPS system 100 fully charged. Excess power not needed for recharging may be directed to the rectifier/inductor system 700 to be used to power the DC motor 330. When the battery/UPS system 100 is in a fully charged state, all of the power to drive the DC motor 330 may be supplied by the battery charging system 600. In this manner, the battery/UPS system 100 may function as a current catalyst as opposed to a current provider.

As will be understood by those skilled in the art, the invention may be embodied in other specific forms without departing from the spirit or essential characteristics thereof. The elements described above are provided as illustrative examples of one technique for implementing the invention. One skilled in the art will recognize that many other implementations are possible without departing from the present invention as recited in the claims. For example, the types, sizes and capacities of the batteries, electric motor, electric generator, inductor and rectifier used may vary without departing from the intended scope of the invention. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. An electric power system comprising:
an electric battery subsystem;
a switching subsystem coupled to the electric battery subsystem;
an inverter coupled to the switching subsystem and the electric battery subsystem;
an electric power distribution subsystem coupled to the inverter, the electric power distribution subsystem including an outlet load line configured to be connected to an electric load;
a rectifier subsystem coupled to the electric power distribution subsystem;
an electrically powered function control subsystem coupled to the rectifier subsystem, the electrically powered function control subsystem including a processor and memory;
a capacitor subsystem coupled to the electrically powered function control subsystem;
an electric motor coupled to the electrically powered function control subsystem;
an electric generator subsystem including an electric generator, the electric generator operatively connected to, and receiving input rotational motion from, the electric motor, wherein output rotational speed of the electric motor and input rotational speed provided to the electric generator are invariable with respect to one another; and
a battery charge controller subsystem coupled to the electric generator subsystem, the switching subsystem, the inverter, and the electric battery subsystem.

2. The electric power system of claim 1, wherein the electric battery subsystem has a first pole with a first polarity and a second pole with a second polarity; the switching subsystem coupled to the first pole of the electric battery subsystem; the battery charge controller subsystem coupled to the switching subsystem and the second pole of the electric battery subsystem; the inverter subsystem coupled to the switching subsystem and the second pole of the electric battery subsystem.

3. The electric power system of claim 1, wherein a rotational speed of the electric motor is set to optimize power depletion of the electric battery subsystem for a predetermined level of available power on the outlet load.

4. The electric power system of claim 1, wherein the electrically powered function control subsystem provides automatic adjustment of the relative rotational speed of the electric motor.

5. The electric power system of claim 1, wherein the electrically powered function control subsystem automatically sets an upper limit on available power for the outlet load line based on electric power output of the electric generator and recharging requirements of the electric battery subsystem.

6. The electric power system of claim 1, wherein the inverter shuts down the electric motor wherein the system is powered by the electric battery subsystem and when the electric battery subsystem discharges to a predetermined level, the inverter restarts the electric motor.

7. The electric power system of claim 6, wherein the electric battery subsystem has a first pole with a first polarity and a second pole with a second polarity; the switching subsystem coupled to the first pole of the electric battery subsystem; the electrically powered function control subsystem coupled to the switching subsystem and the second pole of the electric battery subsystem; the inverter subsystem coupled to the switching subsystem, and the second pole of the electric battery subsystem.

8. An electric power system comprising:
an electric battery subsystem;
a switching subsystem coupled to the electric battery subsystem;
an inverter coupled to the switching subsystem and the electric battery subsystem;
a first electric power distribution subsystem coupled to the inverter, the first electric power distribution subsystem including an outlet load line configured to be connected to an electric load;
a rectifier subsystem coupled to the first electric power distribution subsystem;
an electrically powered function control subsystem coupled to the switching subsystem, the inverter subsystem, and the electric battery subsystem, the electrically powered function control subsystem including a processor and memory;
a capacitor subsystem coupled to the electrically powered function control subsystem;

an electric motor coupled to the electrically powered function control subsystem;

an electric generator subsystem including an electric generator, the electric generator operatively connected to, and receiving input rotational motion from, the electric motor, wherein output rotational speed of the electric motor and input rotational speed provided to the electric generator are invariable with respect to one another; and a second electric power distribution subsystem coupled to the electric generator subsystem and the inverter subsystem.

9. The electric power system of claim 8, wherein a rotational speed of the electric motor is set to optimize power depletion of the electric battery subsystem for a predetermined level of available power on the outlet load.

10. The electric power system of claim 8, wherein the electrically powered function control subsystem provides automatic adjustment of the relative rotational speed of the electric motor.

11. The electric power system of claim 8, wherein the electrically powered function control subsystem automatically sets an upper limit on available power for the outlet load line based on electric power output of the electric generator and recharging requirements of the electric battery subsystem.

12. The electric power system of claim 8, wherein the inverter shuts down the electric motor wherein the system is powered by the electric battery subsystem and when the electric battery subsystem discharges to a predetermined level, the inverter restarts the electric motor.

13. An electric power system comprising:
an electric battery subsystem;
a switching subsystem coupled to the electric battery subsystem;
a rectifier subsystem coupled to the electric battery subsystem;
a breaker subsystem coupled to the rectifier subsystem;
an electrically powered function control subsystem coupled to the rectifier subsystem, the electrically powered function control subsystem including a processor and memory;
a capacitor subsystem coupled to the electrically powered function control subsystem;
an electric motor coupled to the electrically powered function control subsystem;
an electric generator subsystem including an electric generator, the electric generator operatively connected to, and receiving input rotational motion from, the electric motor, wherein output rotational speed of the electric motor and input rotational speed provided to the electric generator are invariable with respect to one another;
an inverter subsystem coupled to the electric generator subsystem;
an electric power distribution subsystem coupled to the inverter subsystem and the breaker system, the electric power distribution subsystem including an outlet load line configured to be connected to an electric load; and
a battery charge controller subsystem coupled to the electric generator subsystem and the electric battery subsystem.

14. The electric power system of claim 13, wherein the electric battery subsystem has a first pole with a first polarity and a second pole with a second polarity; the switching subsystem coupled to the first pole of the electric battery subsystem; the electrically powered function control subsystem coupled to the switching subsystem and the second pole of the electric battery subsystem; the inverter subsystem coupled to the switching subsystem, and the second pole of the electric battery subsystem.

15. The electric power system of claim 13, wherein a rotational speed of the electric motor is set to optimize power depletion of the electric battery subsystem for a predetermined level of available power on the outlet load.

16. The electric power system of claim 13, wherein the electrically powered function control subsystem provides automatic adjustment of the relative rotational speed of the electric motor.

17. The electric power system of claim 13, wherein the electrically powered function control subsystem automatically sets an upper limit on available power for the outlet load line based on electric power output of the electric generator and recharging requirements of the electric battery subsystem.

* * * * *